(12) United States Patent
Nordbruch

(10) Patent No.: US 11,938,964 B2
(45) Date of Patent: Mar. 26, 2024

(54) METHOD FOR SAFELY ASCERTAINING INFRASTRUCTURE DATA

(71) Applicant: Robert Bosch GmbH, Stuttgart (DE)

(72) Inventor: Stefan Nordbruch, Leonberg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 41 days.

(21) Appl. No.: 17/004,957

(22) Filed: Aug. 27, 2020

(65) Prior Publication Data

US 2021/0086788 A1 Mar. 25, 2021

(30) Foreign Application Priority Data

Sep. 23, 2019 (DE) .......................... 102019214484.5

(51) Int. Cl.
*B60W 60/00* (2020.01)
*B60W 30/08* (2012.01)
*H04W 4/44* (2018.01)

(52) U.S. Cl.
CPC ........ *B60W 60/0011* (2020.02); *B60W 30/08* (2013.01); *H04W 4/44* (2018.02); *B60W 2552/00* (2020.02)

(58) Field of Classification Search
None
See application file for complete search history.

(56) References Cited

U.S. PATENT DOCUMENTS

| 2016/0379486 A1* | 12/2016 | Taylor | G08G 1/08 340/905 |
| 2019/0045468 A1* | 2/2019 | Blasco Serrano | H04W 56/0015 |
| 2020/0269872 A1* | 8/2020 | Cho | H04W 4/90 |
| 2021/0118294 A1* | 4/2021 | Ran | G08G 1/096783 |

FOREIGN PATENT DOCUMENTS

| DE | 102012215343 A1 | 5/2014 |
| DE | 102017204603 A1 | 9/2018 |
| DE | 102017212227 A1 | 1/2019 |
| DE | 102018124807 A1 | 4/2019 |
| DE | 102018221740 A1 | 6/2020 |

* cited by examiner

*Primary Examiner* — James J Lee
*Assistant Examiner* — Wenyuan Yang
(74) *Attorney, Agent, or Firm* — NORTON ROSE FULBRIGHT US LLP; Gerard A. Messina

(57) ABSTRACT

A method for safely ascertaining infrastructure data for driving a motor vehicle in at least partially automated fashion. The method includes receiving data signals, which represent infrastructure sensor data generated by at least one infrastructure sensor and/or motor vehicle data generated by at least one source motor vehicle, receiving safety condition signals, which represent at least one safety condition for safely ascertaining infrastructure data based on the data, checking whether the at least one safety condition is fulfilled, ascertaining infrastructure data, on the basis of which it is possible to drive a destination motor vehicle in at least partially automated fashion, based on the data as a function of a result of the check as to whether the at least one safety (Continued)

condition is fulfilled, generating infrastructure data signals, which represent the ascertained infrastructure data, outputting the generated infrastructure data signals.

9 Claims, 13 Drawing Sheets

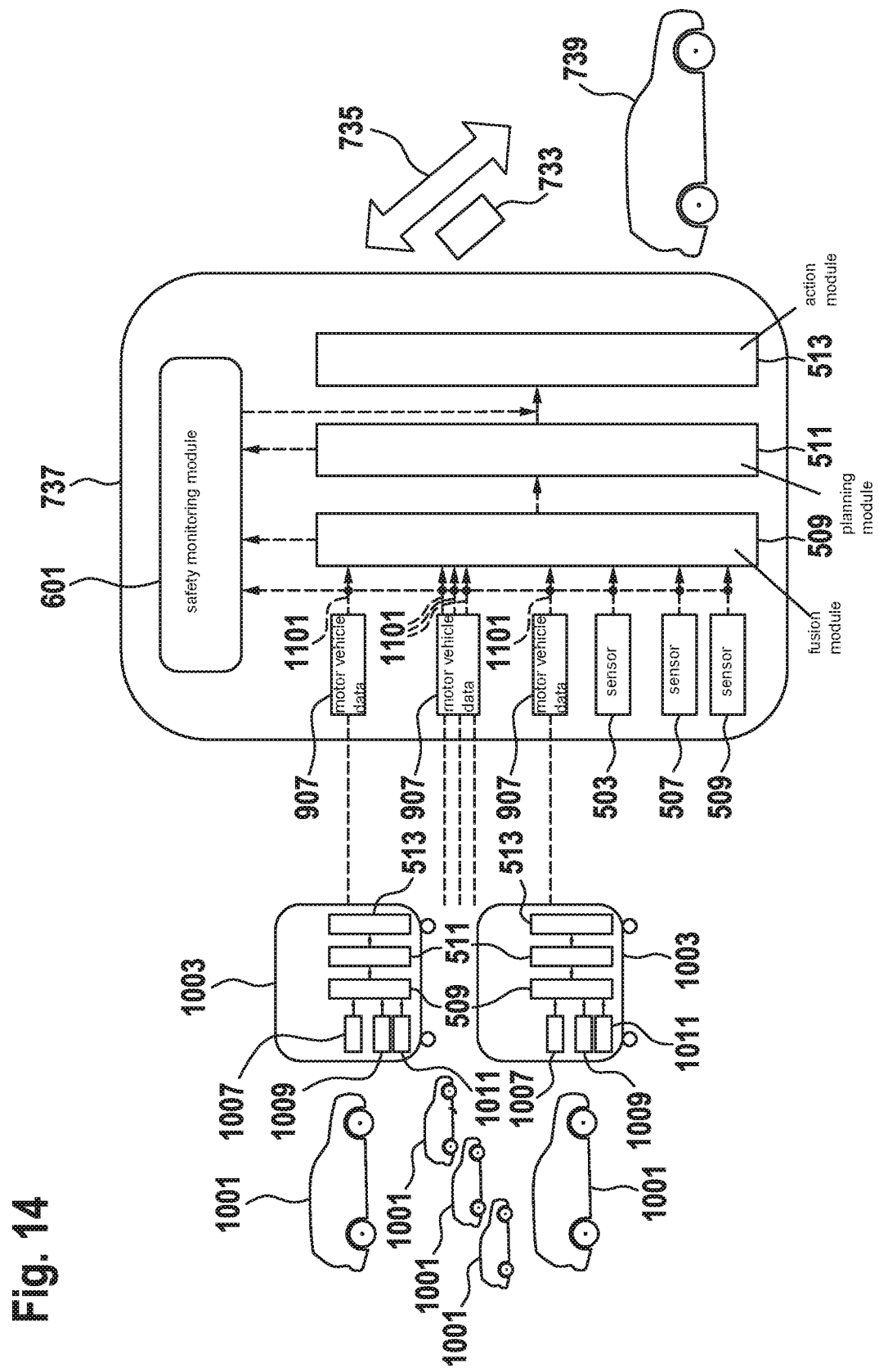

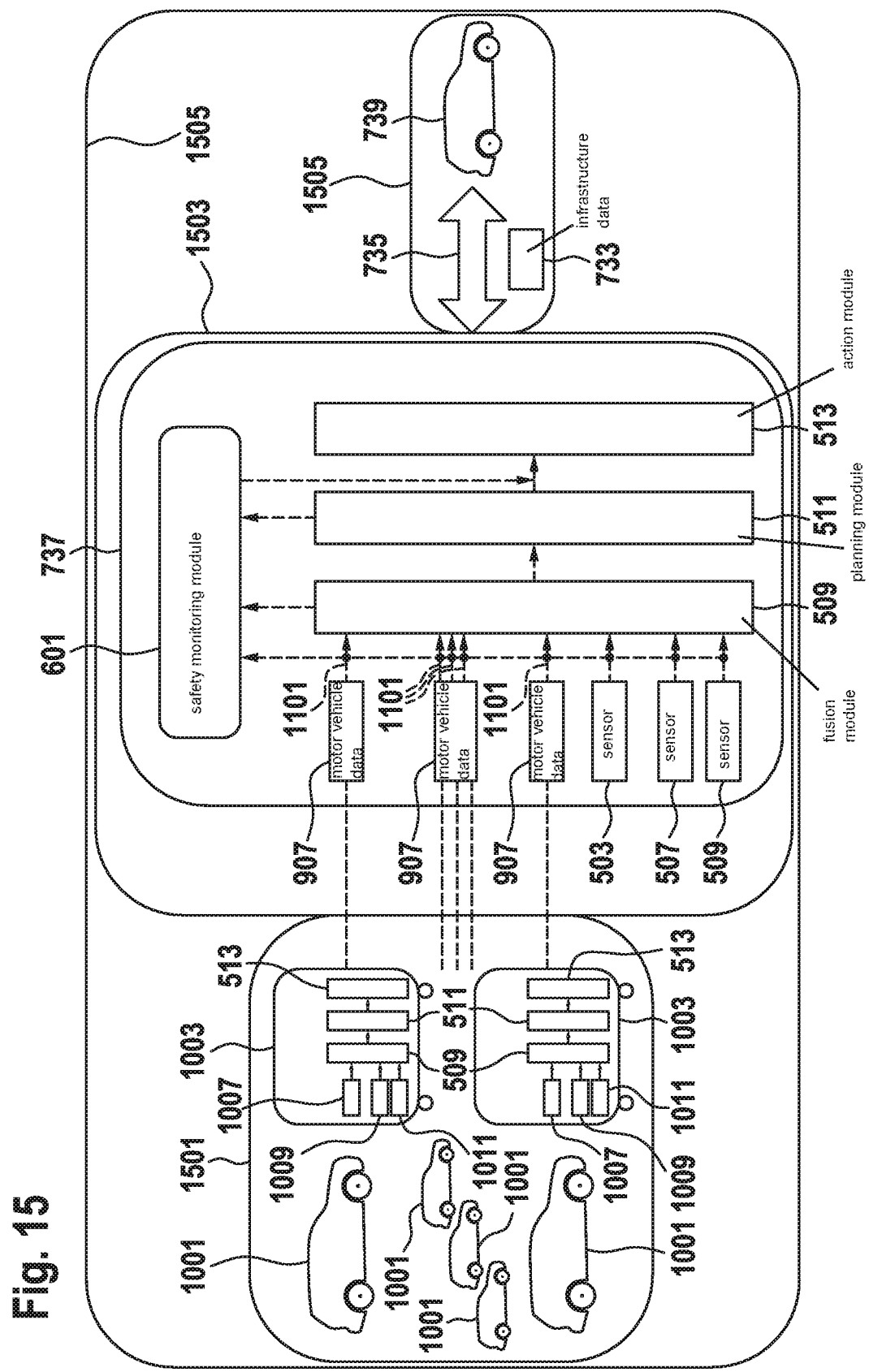

METHOD FOR SAFELY ASCERTAINING INFRASTRUCTURE DATA

CROSS REFERENCE

The present application claims the benefit under 35 U.S.C. § 119 of German Patent Application No. 102019214484.5, filed on Sep. 23, 2019, which is expressly incorporated herein by reference in its entirety.

FIELD

The present invention relates to a method for safely ascertaining infrastructure data for driving a motor vehicle in at least partially automated fashion. The present invention further relates to a device, to an infrastructure, to a computer program and to a machine-readable storage medium.

BACKGROUND INFORMATION

German Patent Application No. DE 10 2017 204 603 A1 describes a vehicle control system and a method for controlling a vehicle.

German Patent Application No. DE 10 2018 124 807 A1 describes a system and a method for operating a hybrid drive train of a vehicle.

German Patent Application No. DE 10 2017 212 227 A1 describes a method and a system for vehicle data collection and vehicle control in road traffic.

Motor vehicles, which use data from an infrastructure, use these data for example for warning functions, information functions and comfort functions.

When infrastructure data are used for driving a motor vehicle in at least partially automated fashion, it should be ensured for example that the infrastructure data were not manipulated, for example.

SUMMARY

An object of the present invention is to provide for efficiently and safely ascertaining infrastructure data for driving a motor vehicle in at least partially automated fashion.

This object may be achieved by example embodiments of the present invention. Advantageous developments of the present invention are described herein.

According to a first aspect of the present invention, an example method is provided for safely ascertaining infrastructure data for driving a motor vehicle in at least partially automated fashion, comprising the following steps:
  receiving data signals, which represent infrastructure sensor data generated by at least one infrastructure sensor and/or motor vehicle data generated by at least one source motor vehicle, receiving safety condition signals, which represent at least one safety condition for safely ascertaining infrastructure data based on the data,
  checking whether the at least one safety condition is fulfilled, ascertaining infrastructure data, on the basis of which it is possible to drive a destination motor vehicle in at least partially automated fashion, based on the data as a function of a result of the check as to whether the at least one safety condition is fulfilled,
  generating infrastructure data signals, which represent the ascertained infrastructure data,
  outputting the generated infrastructure data signals.

According to a second aspect of the present invention, an example device is provided, which is designed to perform all steps of the method according to the first aspect.

According to a third aspect of the present invention, an example infrastructure is provided, which comprises the device according to the second aspect.

According to a fourth aspect of the present invention, a computer program is provided, which comprises commands, which prompt a computer, for example the device according to the second aspect, when executing the computer program, to implement a method according to the first aspect.

According to a fifth aspect of the present invention, a machine-readable storage medium is provided, on which the computer program according to the third aspect is stored.

If the singular is used below for the terms "motor vehicle," "source motor vehicle," "destination motor vehicle," the plural is always to be understood as included as well and vice versa. That is to say in particular that explanations provided in convection with a motor vehicle and/or a source motor vehicle and/or a destination motor vehicle also apply to multiple motor vehicles and/or multiple source motor vehicles and/or multiple destination motor vehicles and vice versa.

A source motor vehicle may be for example a destination motor vehicle. That is to say that a source motor vehicle provides motor vehicle data to an infrastructure and receives infrastructure data from the infrastructure.

The infrastructure data are generated outside of the motor vehicle in an infrastructure.

The term "source" in "source motor vehicle" signifies in particular that such a motor vehicle represents a source for input data, in particular for the device according to the second aspect of the present invention.

That is to say in particular that the following sources for input data may be provided: motor vehicle or infrastructure or both motor vehicle as well as infrastructure.

The term "destination" in "destination motor vehicle" means in particular that such a motor vehicle represents a destination for the infrastructure data.

Infrastructure data are in particular data, which are suitable for driving a motor vehicle in at least partially automated fashion and/or which may be expediently used for this type of driving.

The present invention is based on the realization and includes this realization that before infrastructure data for driving a destination motor vehicle in at least partially automated fashion are ascertained, a check is performed to determine whether or not at least one safety condition is fulfilled. Based on this result, the infrastructure data are ascertained, on the basis of which a destination motor vehicle may be driven in at least partially automated fashion.

Thus, is it advantageously possible to ensure in an efficient manner that the destination motor vehicle is able to use the infrastructure data safely for controlling a lateral and/or longitudinal guidance of the destination motor vehicle in at least partially automated fashion in order to drive the destination motor vehicle in at least partially automated fashion. Via the safety condition, it is thus possible to specify and/or determine or define a context, within which the infrastructure data may be safely ascertained.

This may yield in particular the technical advantage of minimizing or avoiding a risk for road users in the surroundings of the destination motor vehicle. This advantageously makes it possible to ensure in particular that a risk for the destination motor vehicle itself can be minimized or avoided.

In the sense of the description, "safe" means in particular "safe" and "secure." These two English terms are normally translated into German as "sicher." In English, however, they have in part a different meaning.

The term "safe" pertains in particular to the topic of accident and accident avoidance. A control of the lateral and/or longitudinal guidance of the destination motor vehicle based on the infrastructure data that is "safe" is one in which a probability of an accident and/or a collision is smaller than or smaller than/equal to a predetermined probability threshold value. Infrastructure data ascertained in this manner are thus "safe."

The term "secure" pertains in particular to the topic of computer protection or hacker protection, that is, in particular to how well a (computer) infrastructure and/or a communication infrastructure, in particular a communication link between a motor vehicle, in particular a destination motor vehicle and/or source motor vehicle, and a device according to the second aspect, is secured against unauthorized access and/or against data manipulations by third parties ("hackers").

A control of the lateral and/or longitudinal guidance of the motor vehicle based on the infrastructure data that is "secure" is thus in particular based on an appropriate and sufficient computer protection and/or hacker protection. Infrastructure data ascertained in this manner are thus "secure."

This may yield in particular the technical advantage of providing an efficient concept for safely ascertaining infrastructure data for driving a motor vehicle, that is, the destination motor vehicle, in at least partially automated fashion.

The formulation "driving in at least partially automated fashion" comprises one or several of the following cases: assisted driving, partially automated driving, highly automated driving, fully automated driving.

Assisted driving means that a driver of the motor vehicle permanently performs either the lateral or the longitudinal guidance of the motor vehicle. The respectively other driving task (that is, controlling the longitudinal or the lateral guidance of the motor vehicle) is performed automatically. That is to say that in assisted driving of the motor vehicle either the lateral guidance or the longitudinal guidance is controlled automatically.

Partially automated driving means that in a specific situation (for example: driving on a freeway, driving within a parking facility, passing an object, driving within a traffic lane, which is defined by lane markers) and/or for a certain time period a longitudinal guidance and a lateral guidance of the motor vehicle are controlled automatically. It is not necessary for a driver of the motor vehicle to control the longitudinal and lateral guidance of the motor vehicle manually. Nevertheless, the driver must permanently monitor the automatic control of the longitudinal and lateral guidance so as to be able to intervene manually when necessary. The driver must always be prepared to take complete control of driving the motor vehicle.

Highly automated driving means that for a certain time period in a specific situation (for example: driving on a freeway, driving within a parking facility, passing an object, driving within a traffic lane, which is defined by lane markers) a longitudinal guidance and a lateral guidance of the motor vehicle are controlled automatically. It is not necessary for a driver of the motor vehicle to control the longitudinal and lateral guidance of the motor vehicle manually. It is not necessary for the driver permanently to monitor the automatic control of the longitudinal and lateral guidance so as to be able to intervene manually when necessary. When necessary, a takeover request is automatically output to the driver for taking over the control of the longitudinal and lateral guidance, in particular with sufficient time to respond. Thus, the driver must be potentially able to take control of longitudinal and lateral guidance. Limits of the automatic control of the lateral and longitudinal guidance are detected automatically. In highly automated driving, it is not possible in every initial situation to bring about a risk-minimized state automatically.

Fully automated driving means that in a specific situation (for example: driving on a freeway, driving within a parking facility, passing an object, driving within a traffic lane, which is defined by lane markers) a longitudinal guidance and a lateral guidance of the motor vehicle are controlled automatically. It is not necessary for a driver of the motor vehicle to control the longitudinal and lateral guidance of the motor vehicle manually. It is not necessary for the driver to monitor the automatic control of the longitudinal and lateral guidance so as to be able to intervene manually when necessary. Prior to a termination of the automatic control of the lateral and longitudinal guidance, a request is automatically output to the driver to take over the task of driving (controlling the lateral and longitudinal guidance of the motor vehicle), in particular with sufficient time to respond. If the driver does not take over the task of driving, the motor vehicle is automatically returned to a risk-minimized state. Limits of the automatic control of the lateral and longitudinal guidance are detected automatically. In all situations it is possible to return the motor vehicle automatically to a risk-minimized system state.

One specific example embodiment provides that, if the at least one safety condition is not fulfilled, the ascertaining of infrastructure data comprises at least one securing step for ensuring that the infrastructure data may be ascertained safely based on the data.

This may yield, for example, the technical advantage that the infrastructure data are safe even in the event that the at least one safety condition is not fulfilled.

One specific example embodiment provides for the at least one securing steps to be respectively selected from the following group of securing steps: redundant processing, in particular computing, of the data, diversitary processing, in particular computing, of the data, checking an operability of a redundant component for processing, in particular computing, the data.

This may yield, for example, the technical advantage of allowing the use of particularly suitable securing steps.

One specific example embodiment provides for the infrastructure data to comprise one or several elements selected from the following group of infrastructure data: infrastructure sensor data of an infrastructure environment sensor, surroundings data, which represent a surroundings of the destination motor vehicle, weather data, which represent a weather in a surroundings of the destination motor vehicle, traffic data, which represent a traffic in a surroundings of the destination motor vehicle, hazard data, which represent a location and/or a type of a hazard area in the surroundings of the destination motor vehicle, road user state data, which represent a state of a road user in the surroundings of the destination motor vehicle, drive specification, which the destination motor vehicle is to follow by driving in at least partially automated fashion, remote control commands for remote-controlling a lateral and/or longitudinal guidance of the destination motor vehicle, motor vehicle data.

This may yield, for example, the technical advantage that particularly suitable infrastructure data are ascertained.

One specific example embodiment provides for the motor vehicle data to comprise respectively an element selected from the following group of motor vehicle data: drive planning data, position data, speed data, environment sensor data of an environment sensor of the source motor vehicle, diagnostic data, environment model of a surroundings of the source motor vehicle, route data, weather data, which represent a weather in a surroundings of the source motor vehicle, traffic data, which represent a traffic in a surroundings of the source motor vehicle, hazard data, which represent a location and/or a type of a hazard area in the surroundings of the source motor vehicle, road user state data, which represent a state of a road user in the surroundings of the source motor vehicle.

This may yield, for example, the technical advantage of allowing the use of particularly suitable motor vehicle data.

One specific example embodiment of the present invention provides for the at least one safety condition to be respectively an element selected from the following group of safety conditions: existence of a confirmation of the source motor vehicle that the motor vehicle data are secure, existence of a predetermined safety integrity level (SIL) or automotive safety integrity level (ASIL) of at least the source motor vehicle and the infrastructure, in particular including a communication link and/or communication components, in particular with respect to the overall systems in the source motor vehicle and infrastructure and in particular parts, e.g., components, algorithms, interfaces, etc., existence of a maximum latency of a communication between the source motor vehicle and the infrastructure, existence of a predetermined computer protection level of a device according to the second aspect, existence of predetermined components and/or algorithms and/or communication options that are used for performing the steps of the method according to the first aspect, existence of a redundancy and/or diversity in predetermined components and/or algorithms and/or communication options that are used for performing the steps of the method according to the first aspect, existence of predetermined availability information, which indicates an availability of predetermined components and/or algorithms and/or communication options, existence of predetermined quality criteria of the predetermined components and/or algorithms and/or communication options, existence of a plan which comprises measures for reducing errors and/or measures in the event of failures of predetermined components and/or algorithms and/or communication options and/or measures for fault analyses and/or measures in the event of misinterpretations, existence of one or multiple fallback scenarios, existence of a predetermined function, existence of a predetermined traffic situation, existence of a predetermined weather, maximally possible time for a respective performance and/or execution of a step or of multiple steps of the method according to the first aspect, existence of a result of a check to determine that elements and/or functions, which are used for carrying out the method according to the first aspect, currently function in a faultless manner.

It is possible to ascertain safe infrastructure data efficiently in particular if a confirmation of the source motor vehicle exists that the motor vehicle data are safe.

A communication link is for example a communication link between the device according to the second aspect and the source motor vehicle. A communication link comprises for example one or multiple communication channels.

In one specific example embodiment of the present invention, a component, which is used to carry out the method according to the first aspect, is an element selected from the following group of components: environment sensor, source motor vehicle, infrastructure, device according to the second aspect, source motor vehicle system, in particular drive system, clutch system, brake system, driver assistance system, communication interface of the source motor vehicle and/or of the infrastructure, processor, input, output of the device according to the second aspect, control unit, in particular main control unit of the source motor vehicle.

A computer protection level defines in particular the following: activated firewall and/or valid encryption certificate for encrypting a communication between the source motor vehicle and the infrastructure and/or activated virus program having updated virus signatures and/or existence of a protection, in particular a mechanical protection, in particular a break-in protection, of the computer, in particular of the device according to the second aspect, and/or existence of a possibility for checking that signals, in particular infrastructure data signals, were transmitted correctly, that is, error-free.

An algorithm comprises for example the computer program according to the third aspect.

The fact that in particular a check is performed to determine that there exists a redundancy and/or diversity in predetermined components and/or algorithms and/or communication options yields for example the technical advantage that even in the event of a failure of the respective component, for example a computer, and/or of the corresponding algorithm and/or of the corresponding communication option, it is nevertheless possible to ascertain safe infrastructure data.

To ensure that results are correct, it is possible in one specific embodiment of the present invention to calculate these results multiple times for example and to compare the respective results with one another. Only if there is agreement among the results is it determined for example that the results are correct. If multiple times is an uneven number, it may be provided for example that a determination is made that the result corresponding to the highest number of identical results is correct.

One specific example embodiment of the present invention provides for one or multiple method steps to be documented, in particular documented in a blockchain.

This may yield, for example, the technical advantage of allowing the method to be analyzed even after its implementation or execution, on the basis of the documentation. The documentation in a blockchain in particular has the technical advantage that the documentation is secured against manipulation and forgery.

A blockchain is a continuously expandable list of data sets, called "blocks", which are linked to one another by one or multiple cryptographic methods. Each block contains in particular a cryptographically secure hash (erratic value) of the preceding block, in particular a time stamp and in particular transaction data.

One specific example embodiment of the present invention provides for a check to be performed to determine whether a totality made up of the source motor vehicle and of infrastructure involved in the method according to the first aspect including a communication between infrastructure and source motor vehicle is secure so that the source motor vehicle and/or a local and/or a global infrastructure and/or a communication between source motor vehicle and infrastructure are checked accordingly.

That is to say, in particular, that the components used in the implementation of the method according to the first aspect are checked for safety, that is, whether they fulfill specific safety conditions, before the lateral and/or longitudinal guidance of the motor vehicle may be controlled using and/or based on the infrastructure data.

Important and/or dependent criteria are for example one or several of the safety conditions described previously.

According to one specific example embodiment of the present invention, an infrastructure sensor is an element selected from the following group of sensors: environment sensor, temperature sensor, pressure sensor, gas sensor, rain sensor.

According to one specific example embodiment of the present invention, an environment sensor is one of the following environment sensors: radar sensor, lidar sensor, ultrasonic sensor, magnetic field sensor, infrared sensor and video sensor, in particular video sensor of a video camera, audio sensor, in particular microphone.

One specific example embodiment of the present invention provides for the method according to the first aspect to be a computer-implemented method.

One specific example embodiment of the present invention provides for the example method according to the first aspect to be carried out or implemented using the device according to the second aspect.

Device features result analogously from corresponding method features and vice versa. That is to say in particular that technical functionalities of the device according to the second aspect analogously result from corresponding technical functionalities of the method according to the first aspect and vice versa.

The formulation "at least one" stands in particular for "one or several."

Exemplary embodiments of the present invention are illustrated in the figures and are explained in greater detail below.

BRIEF DESCRIPTION OF THE DRAWINGS

FIGS. 11 to 15 show respectively one block diagram in accordance with an example embodiment of the present invention.

Below, the same reference numerals may be used for identical features.

DETAILED DESCRIPTION OF EXAMPLE EMBODIMENTS

Figure 1:
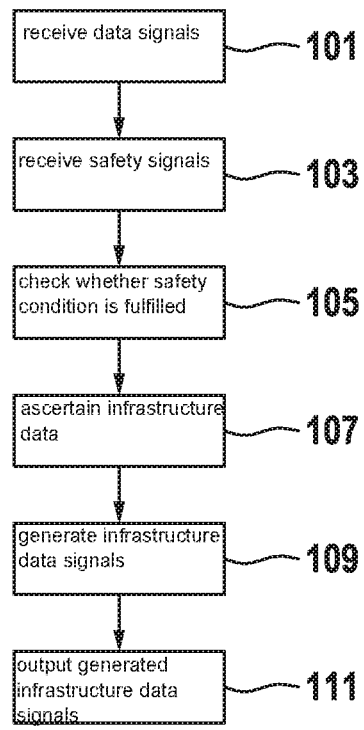
FIG. 1 shows a flow chart of an example method according to the first aspect of the present invention.

FIG. 1 shows a flow chart of an example method for safely ascertaining infrastructure data for driving a motor vehicle in at least partially automated fashion in accordance with the present invention, comprising the following steps:

receiving 101 data signals, which represent infrastructure sensor data generated by at least one infrastructure sensor and/or motor vehicle data generated by at least one source motor vehicle, receiving 103 safety condition signals, which represent at least one safety condition for safely ascertaining infrastructure data based on the data, checking 105 whether the at least one safety condition is fulfilled, ascertaining 107 infrastructure data, on the basis of which it is possible to drive a destination motor vehicle in at least partially automated fashion, based on the data as a function of a result of the check as to whether the at least one safety condition is fulfilled, generating 109 infrastructure data signals, which represent the ascertained infrastructure data, outputting 111 the generated infrastructure data signals.

Figure 2:
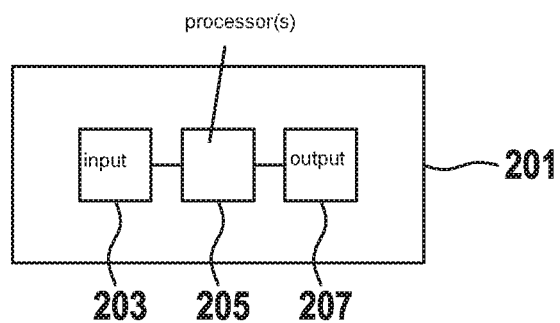
FIG. 2 shows a device in accordance with an example embodiment of the present invention.

FIG. 2 shows an example device 201 in accordance with an example embodiment of the present invention.

Device 201 is designed to perform all of the steps of the method according to the first aspect.

Device 201 comprises an input 201, which is designed to receive the data signals and the safety condition signals.

Device 201 comprises a processor 205, which is designed to perform or execute the steps of checking, of ascertaining and of generating.

Device 201 further comprises an output 207, which is designed to output the generated infrastructure data signals.

Signals that are received are generally received via input 203. Input 203 is thus designed in particular to receive the respective signals.

Signals that are output are generally output via output 207. Output 207 is thus designed in particular to output the respective signals.

According to one specific embodiment of the present invention, multiple processors are provided instead of the one processor 205.

Figure 3:
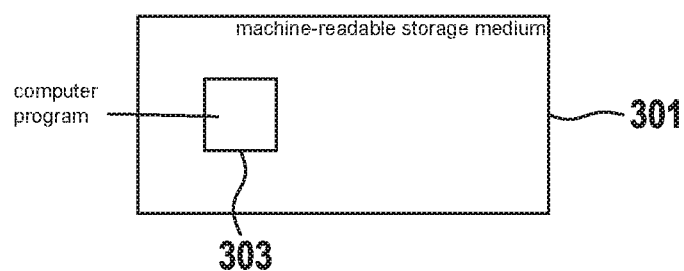
FIG. 3 shows a machine-readable storage medium in accordance with an example embodiment of the present invention.

FIG. 3 shows a machine-readable storage medium 301 in accordance with an example embodiment of the present invention.

A computer program 303 is stored on machine-readable storage medium 301, which comprises commands that prompt a computer when executing computer program 303 to implement a method according to the first aspect.

Figure 4:
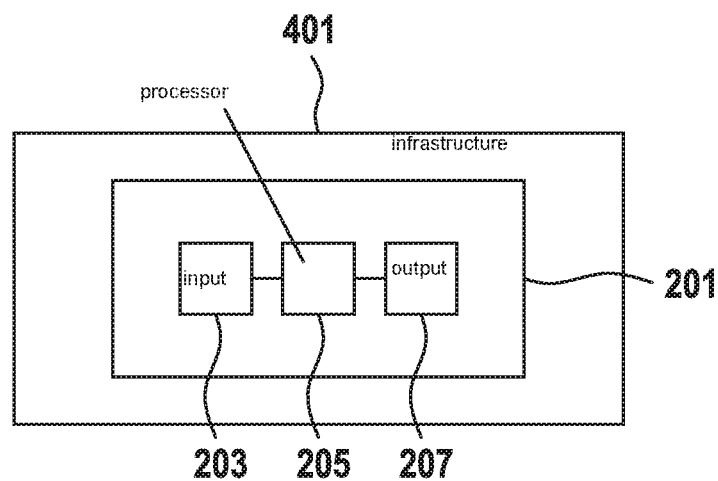
FIG. 4 shows an infrastructure in accordance with an example embodiment of the present invention.

FIG. 4 shows an infrastructure 401 in accordance with an example embodiment of the present invention, which comprises device 201 from FIG. 2.

Figure 5:
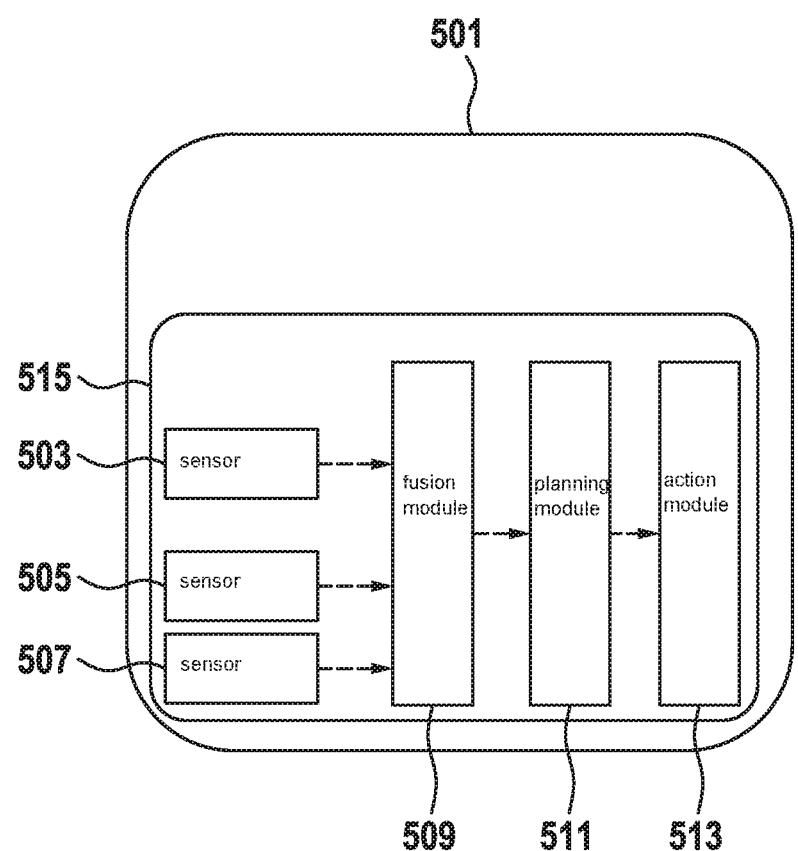
FIG. 5 shows a block diagram in accordance with an example embodiment of the present invention.

FIG. 5 shows a block diagram 501 in accordance with an example embodiment of the present invention.

According to a specific embodiment of the present invention that is not shown, block diagram 501 comprises the device 201 as shown in FIG. 2 or generally a device according to the second aspect.

Block diagram 501 comprises a first infrastructure sensor 503, a second infrastructure sensor 505, and a third infrastructure sensor 507. Infrastructure sensors 503, 505, 507 are environment sensors for example.

In a specific embodiment of the present invention that is not shown, more or fewer than three infrastructure sensors may be provided.

The infrastructure sensor data of infrastructure sensors 503, 505, 507 are provided to a fusion module 509. Fusion module 509 is designed to perform a fusion of the infrastructure sensor data based on the infrastructure sensor data. That is to say that the infrastructure sensor data of the three infrastructure sensors 503, 505, 507 are fused in fusion module 509.

Based on the fused infrastructure sensor data, fusion module 509 is able to ascertain for example an environment model of a surroundings of a motor vehicle, which travels on a road, along which the three infrastructure sensors 503, 505, 507 are situated.

The surroundings model or generally the fused infrastructure sensor data are provided to a planning module 511.

Planning module 511 is designed for example to prepare a drive plan for the motor vehicle based on the environment model and/or on the fused infrastructure sensor data. Planning module 511 plans for example one or multiple driving maneuvers, which the motor vehicle is to execute in at least partially automated fashion.

The planned driving maneuver is provided in an action module 513.

Action module 513 is designed to ascertain control commands for controlling a lateral and/or longitudinal guidance of the motor vehicle based on the planned driving maneuver in such a way that when the lateral and/or longitudinal guidance of the motor vehicle is controlled on the basis of the control commands, the motor vehicle performs or drives the planned driving maneuver in at least partially automated fashion.

Action module 513 is designed for example to generate and output traffic system control commands for controlling one or multiple traffic systems.

A traffic system is for example one of the following traffic systems: light signal system, barrier, variable message sign.

The traffic system control commands are generated for example based on the motor vehicle data and/or the infrastructure sensor data and/or the drive specification.

This yields in particular the technical advantage of making it possible to support the destination motor vehicle efficiently in implementing the drive specification.

The three modules 509, 511, 513 may be respectively implemented or realized for example as software and/or as hardware.

For example, these three modules 509, 511, 513 are implemented in processor 205 of device 201 and/or are executed by processor 205.

That is to say in particular that processor 205 of device 201 may be designed to fuse the infrastructure sensor data and/or to generate a corresponding environment model, to plan corresponding driving maneuvers and to ascertain the corresponding control commands.

Infrastructure sensors 503, 505, 507 and the three modules 509, 511, 513 are drawn within a square 515 that has rounded corners, which is to symbolize that these elements fulfill specific safety conditions so that the corresponding control commands are safely able to control the lateral and/or longitudinal guidance of the motor vehicle.

That is to say for example that these elements exhibit specific quality criteria and/or exhibit predetermined ASIL levels. That is to say in particular that these elements exhibit a predetermined safety integrity level.

Advantageously, this makes it in particular possible to ensure that the individual computations performed by the individual modules 509, 511, 513 provide correct results.

Thus it is possible, for example, advantageously to ensure that infrastructure sensors 503, 505, 507 function reliably.

Figure 6:
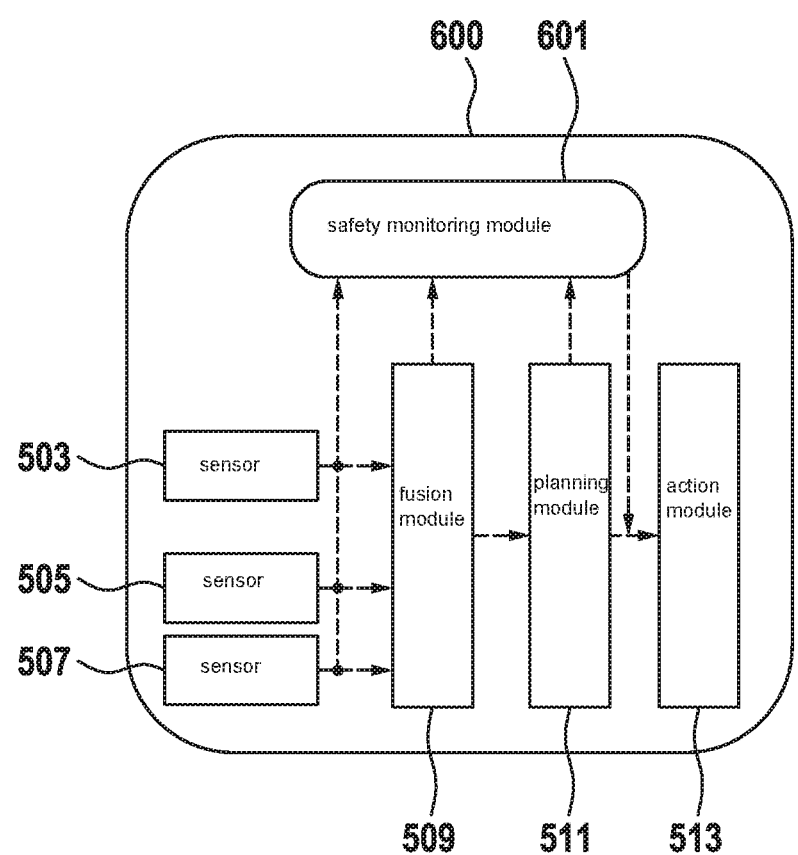
FIG. 6 shows a block diagram in accordance with an example embodiment of the present invention.

FIG. 6 shows a block diagram 600, no square 515 being drawn here, but rather a safety monitoring module 601 being provided, which ensures that even in the absence of certain quality criteria (hence no square 515) with respect to the individual elements, the ascertained control commands nevertheless control the longitudinal and/or lateral guidance of the motor vehicle safely.

Safety monitoring module 601 is thus designed in particular to perform or execute at least one securing step in order to ensure that the lateral and/or longitudinal guidance of the motor vehicle can be controlled safely on the basis of the control commands.

Safety monitoring module 601 performs for example redundant and/or diversitary computing steps.

There may be a provision for example for safety monitoring module 601 to fuse the infrastructure sensor data once more and/or to plan corresponding driving maneuvers once more and/or once more, that is redundantly, to ascertain corresponding control commands.

If these redundant computations provide the same results or at least results that lie within a predetermined tolerance range as the individual modules 509, 511, 513, then it may be assumed that the computed results of modules 509, 511, 513 are correct, and accordingly the control commands may then be used for controlling the lateral and/or longitudinal guidance of the motor vehicle.

Otherwise, there is a provision for example for the individual modules 509, 511, 513 to repeat their respective computations.

One specific embodiment of the present invention may also provide for the motor vehicle to be stopped in the event of a deviating result or generally to be transferred into a safe state, it being possible to perform an emergency stop for example.

One specific embodiment of the present invention provides for safety monitoring module 601 to check the ascertained or planned drive specification only for a certain distance to determine whether it is safe. That is to say that if the drive specification should go beyond a first distance, then the safety check is performed only up to a second distance, this second distance being smaller than the first distance.

One specific embodiment of the present invention provides for safety monitoring module 601 to check the drive specification ascertained or planned by planning module 511, in particular only for a certain distance, only for accident avoidance, to determine whether an accident is avoided. That safety monitoring module 601 checks the drive specification only for accident avoidance means in particular that the check takes into account only emergency measures (e.g., full braking), no comfort aspects in particular being taken into account.

That is to say, in particular, that safety monitoring module 601 checks the drive specification ascertained or planned by planning module 511 up to the first distance only for accident avoidance, comfort aspects being disregarded for this purpose. That is to say that the drive specification of planning module 511 up to the first distance may result in an uncomfortable drive of the motor vehicle. Such a drive specification is nevertheless transmitted in particular to the destination motor vehicle as long as it avoids accidents.

According to one specific embodiment of the present invention, the drive specification, which was ascertained by planning module 511 and which is supposed to be prescribed to the destination motor vehicle, may thus be checked by safety monitoring module 601 using motor vehicle data and/or infrastructure sensor data and/or at least one algorithm provided by the infrastructure to determine whether the drive specification is safe, the control commands being ascertained by action module 513 as a function of a result of the check as to whether the drive specification is safe.

A specific embodiment of the present invention that is not shown provides for the individual elements to fulfill specific safety conditions as well, as is shown symbolically in FIG.

5 by the square 515 that has the rounded corners. At the same time, a safety monitoring module 601, as shown in FIG. 6, may also be provided.

Figure 7:
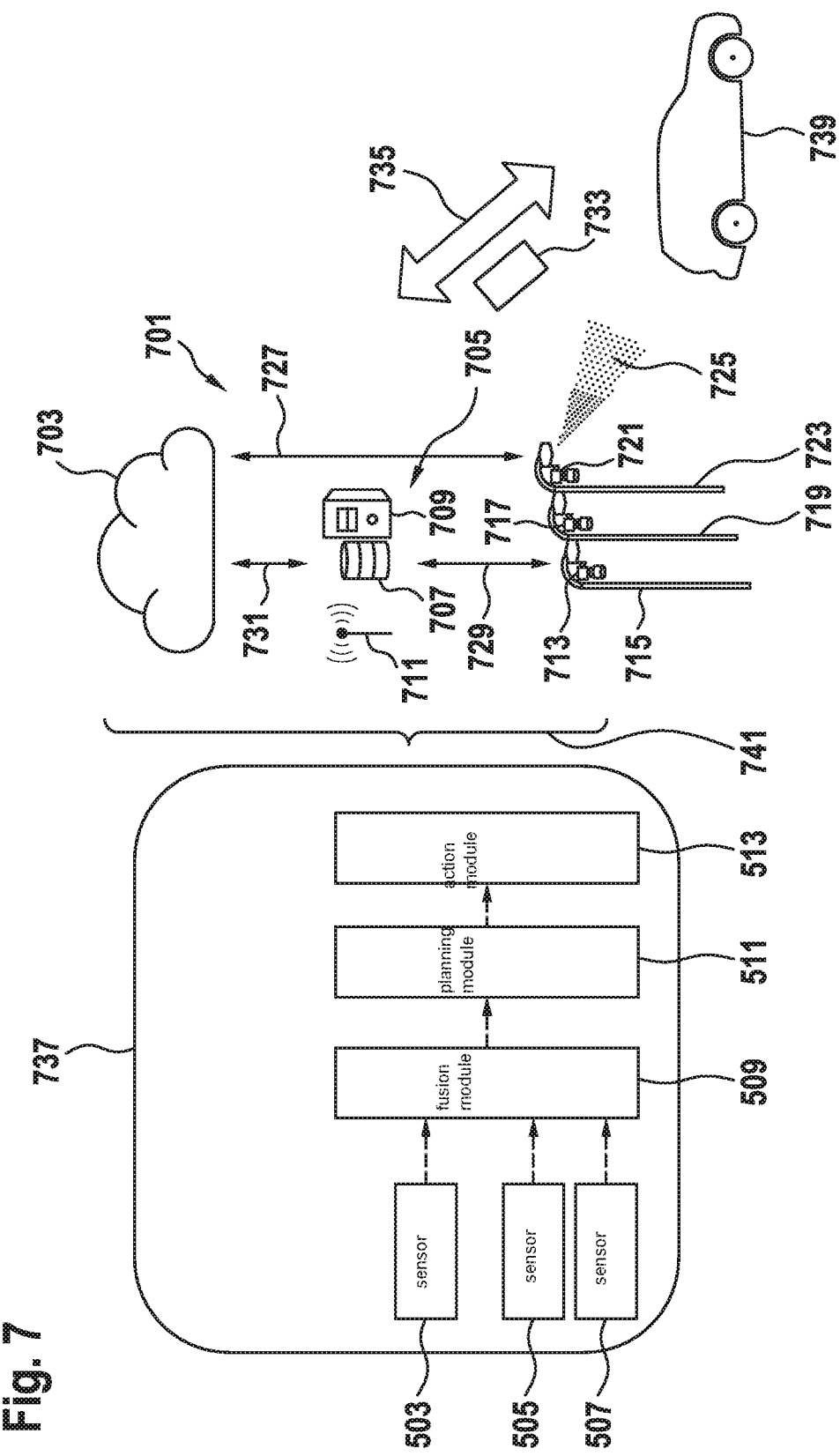
FIGS. 7 to 9 show respectively one infrastructure in accordance with example embodiments of the present invention.

FIG. 7 shows an infrastructure 701 in accordance with an example embodiment of the present invention.

Infrastructure 701 comprises a cloud infrastructure 703 and a local computer infrastructure 705. Local means in particular that this computer structure is spatially located within infrastructure 701, for example at a road, which is comprised by infrastructure 701 for example.

Computer infrastructure 705 comprises a database 707 and a computer 709 or multiple computers 709. Computer infrastructure 705 further comprises a wireless communication interface 711 and/or additionally or instead a wired communication interface.

Via this communication interface 711, local computer infrastructure 705 is able to communicate for example with a motor vehicle 739 and/or with cloud infrastructure 703.

Infrastructure 701 further comprises a first video camera 713 comprising a video sensor (not shown), first video camera 713 being situated on a first street light 715.

A second video camera 717 comprising a video sensor (not shown) is situated on a second street light 719.

A third video camera 721 comprising a video sensor (not shown) is situated on a third street light 723. Third street light 723 emits light for example, which is indicated symbolically by a light cone having reference numeral 725.

The three street lights 715, 719, 723 are situated in spatially distributed fashion within infrastructure 701, in particular along a road, on which motor vehicle 739 is traveling.

Instead of or in addition to the three video cameras 713, 717, 721, environment sensors, for example radar sensors, ultrasonic sensors, lidar sensors and/or magnetic field sensor and/or audio sensors, in particular microphones, may also be provided.

Video cameras 713, 717, 721 communicate for example with local computer infrastructure 705 and with cloud infrastructure 703.

A respective communication between the three video cameras 713, 717, 721 and cloud infrastructure 703 is indicated symbolically by a first double arrow having reference numeral 727.

A communication between video cameras 713, 717, 721 and the local computer infrastructure 705 is indicated symbolically by a second double arrow having reference numeral 729.

A communication between the local computer infrastructure 705 and cloud infrastructure 703 is indicated symbolically by a third double arrow having reference numeral 731.

Infrastructure 701 may generate infrastructure data 733 for example and transmit these to a motor vehicle 739 as the destination motor vehicle, for example via a wireless communication network, for example a WLAN communication network and/or mobile telephony network.

That is to say, in particular, that infrastructure 701 is able to communicate with motor vehicle 739, which is represented symbolically by a fourth double arrow having reference numeral 735.

Infrastructure data 733 may comprise for example the environment sensor data of the video sensors of the three video cameras 713, 717, 721. For example, the raw environment sensor data of video cameras 713, 717, 721 may be transmitted to motor vehicle 739.

The raw environment sensor data may be processed for example, in particular evaluated, the processed or evaluated raw environment sensor data being transmitted to motor vehicle 739 as infrastructure data 733 for example.

For example, infrastructure 701, for example computer 709, may ascertain an environment model of a surroundings of motor vehicle 739 on the basis of the raw environment sensor data, and transmit this environment model as infrastructure data 733 to motor vehicle 739.

For example, computer 709 of local computer infrastructure 705 is able to ascertain a drive specification based on the raw environment sensor data, which motor vehicle 739 is to follow by driving in at least partially automated fashion. This drive specification may be transmitted as infrastructure data 733 to motor vehicle 739 via communication interface 711.

That is to say generally that infrastructure 701 is able to generate or ascertain infrastructure data and transmit these to motor vehicle 739 so that motor vehicle 739 is able to use these infrastructure data 733 for driving in at least partially automated fashion.

FIG. 7 further shows a block diagram 737, which is based on block diagram 501 as shown in FIG. 5. Square 515 may provided in analogy to block diagram 501. Safety monitoring module 601 may be provided in analogy to block diagram 600.

Block diagram 737 represents infrastructure 701 in a simplified manner and/or symbolizes an exemplary interaction of the individual elements of infrastructure 701. The video sensors of video cameras 713, 717, 721 may thus provide as infrastructure sensors 503, 505, 507 their video data to fusion module 509.

Figure 8:
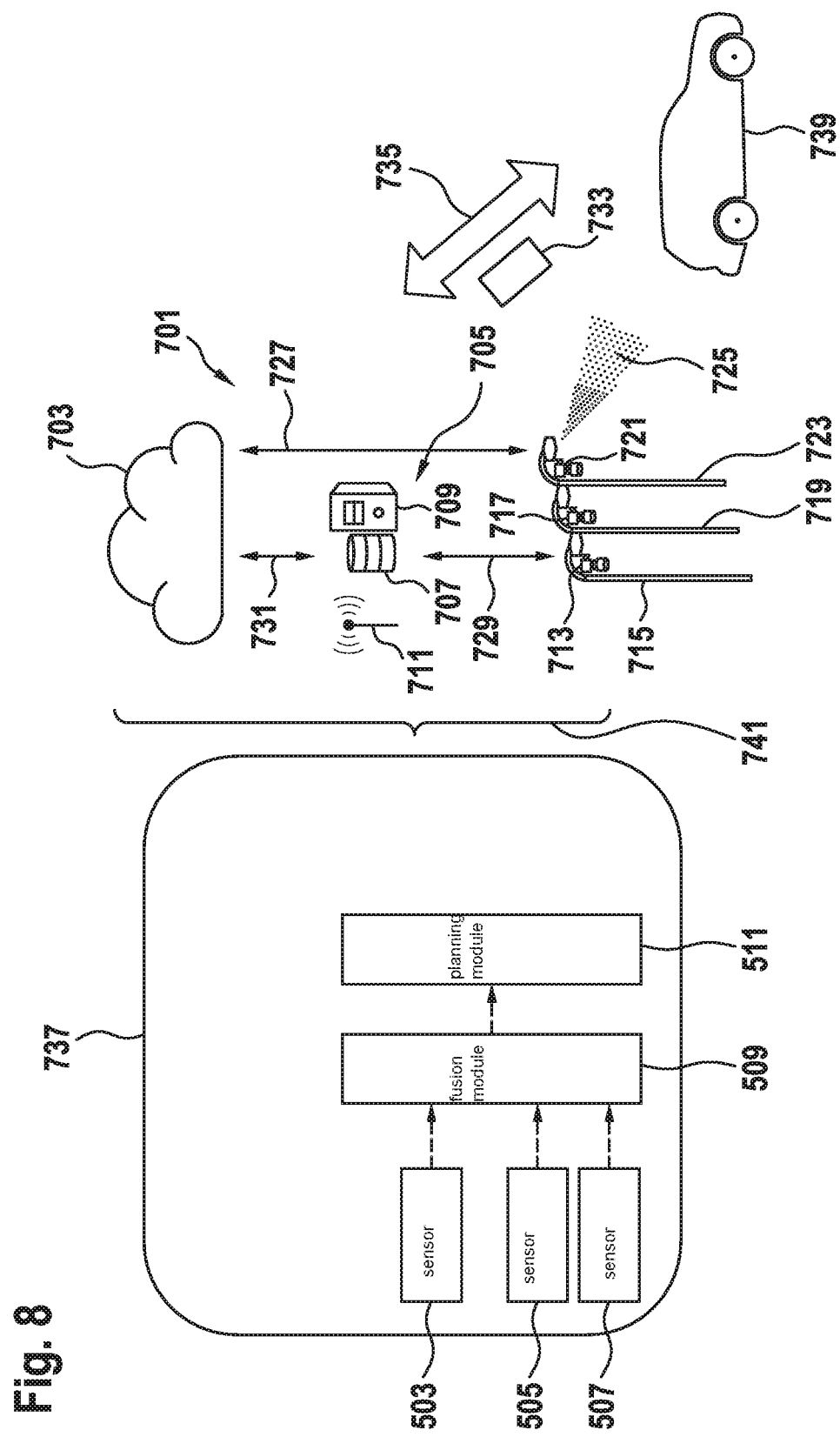

FIG. 8 shows the infrastructure 701 according to FIG. 7, block diagram 737 in this case not having an action module 513, which is to symbolize that no control commands are ascertained for motor vehicle 739. Rather, a driving maneuver planned by planning module 511 is transmitted directly to motor vehicle 739.

Figure 9:
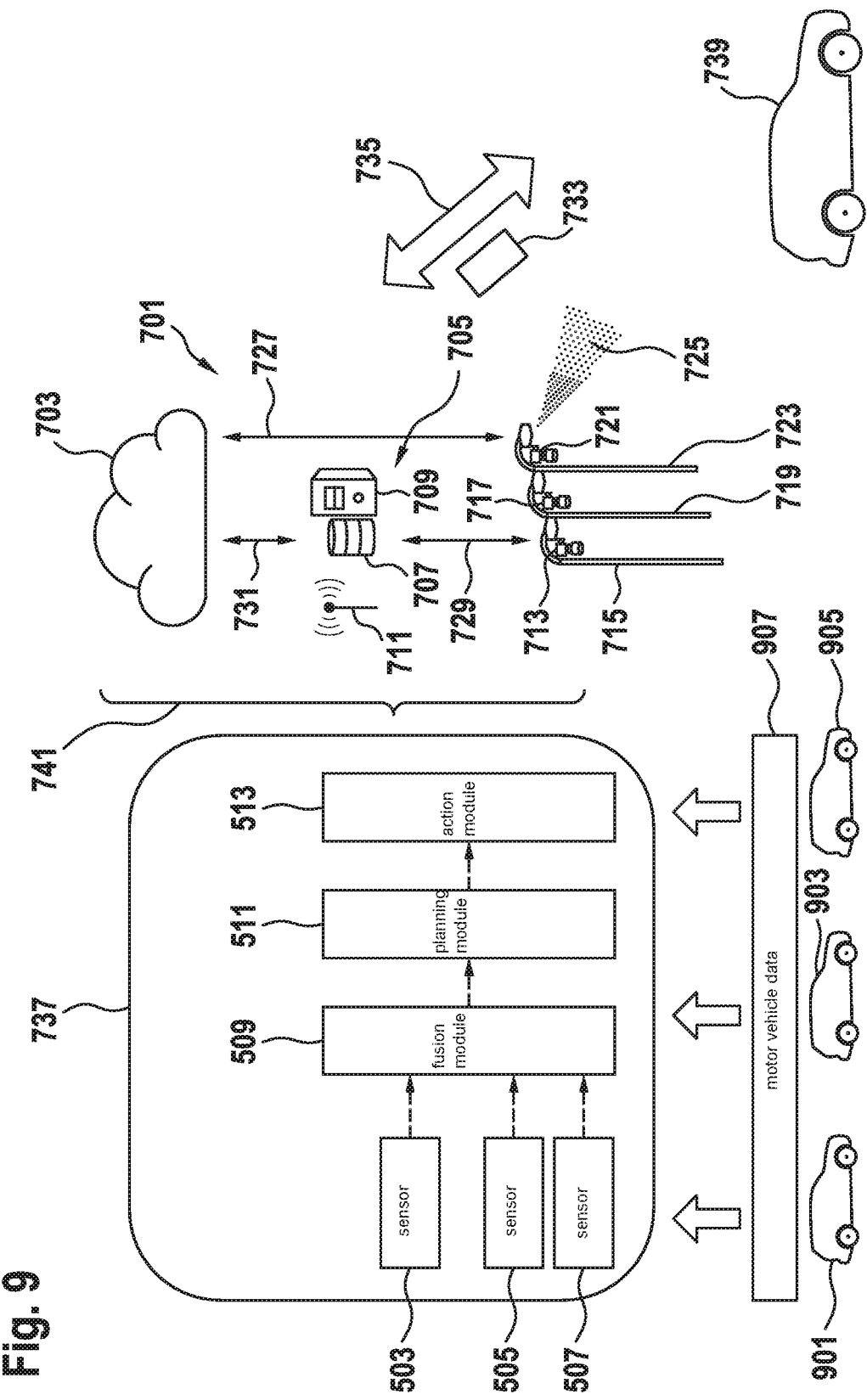

According to FIG. 9, a first source motor vehicle 901, a second source motor vehicle 903 and a third source motor vehicle 905 are provided, which respectively provide motor vehicle data 907 to infrastructure 701.

Figure 10:
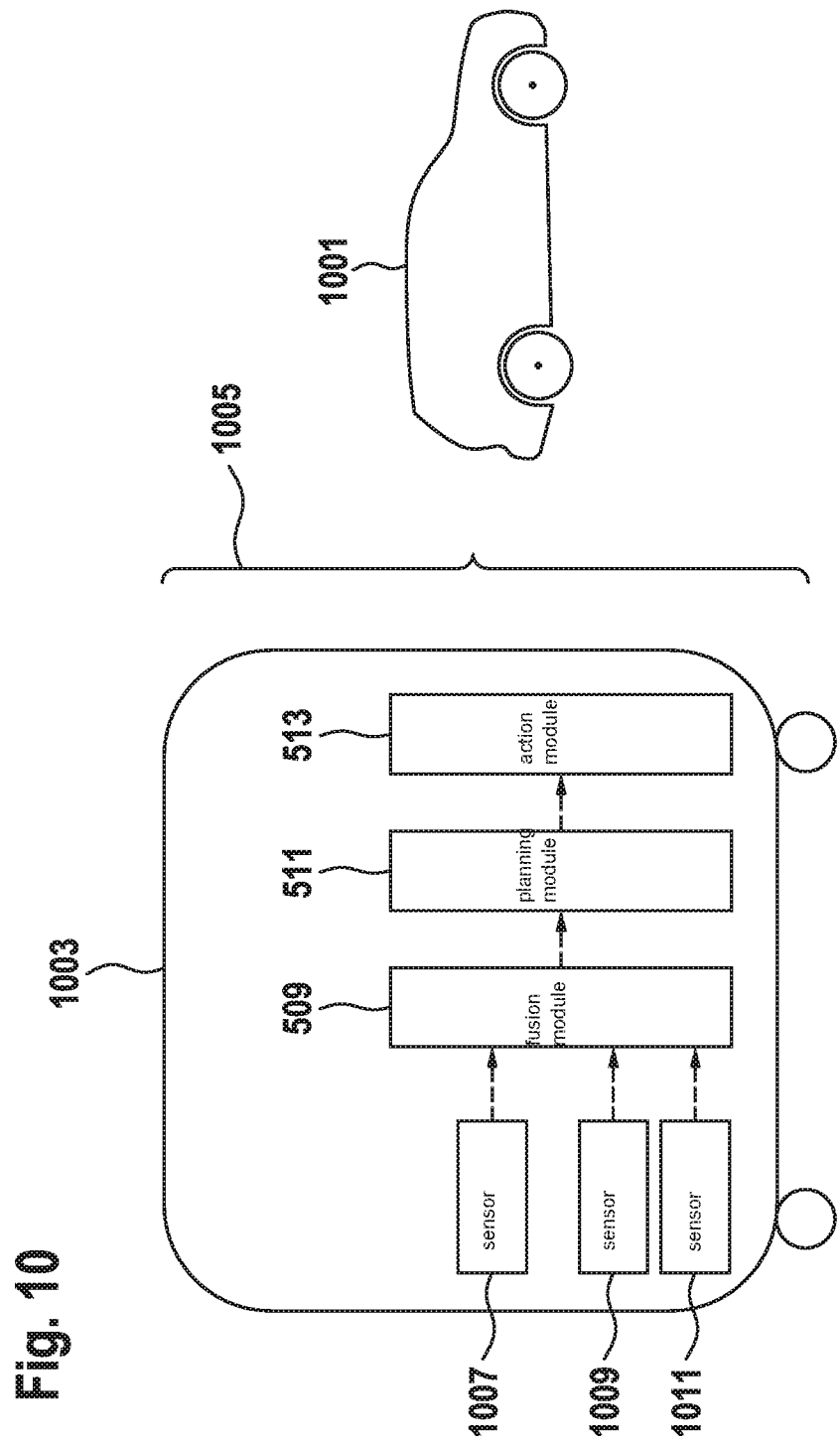
FIG. 10 shows a motor vehicle in accordance with an example embodiment of the present invention.

FIG. 10 shows a motor vehicle 1001 as an example of a source motor vehicle and/or a destination motor vehicle.

A block diagram 1003 represents motor vehicle 1001 in a simplified manner, which is depicted symbolically by a curly bracket 1005.

Block diagram 1003 is formed in an essentially analogous manner to block diagram 501 as shown in FIG. 5. Instead of infrastructure sensors, however, motor vehicle sensors 1007, 1009, 1011 are provided. The functioning of the individual modules 509, 511 and 513 of block diagram 1003 is analogous to the corresponding modules 509, 511, 513 of block diagram 501, motor vehicle sensors and motor vehicle sensor data being provided instead of infrastructure sensors and infrastructure sensor data.

Motor vehicle sensors 1007, 1009, 1011 are environment sensors for example.

In analogy to block diagram 501, a square 515 may also be provided and/or in analogy to block diagram 600 a safety monitoring module 601 may be provided.

Motor vehicle 1001 may transmit for example the motor vehicle sensor data as motor vehicle data to the infrastructure.

Motor vehicle 1001 may transmit for example a driving maneuver planned by planning module 511 as motor vehicle data to the infrastructure.

Figure 11:
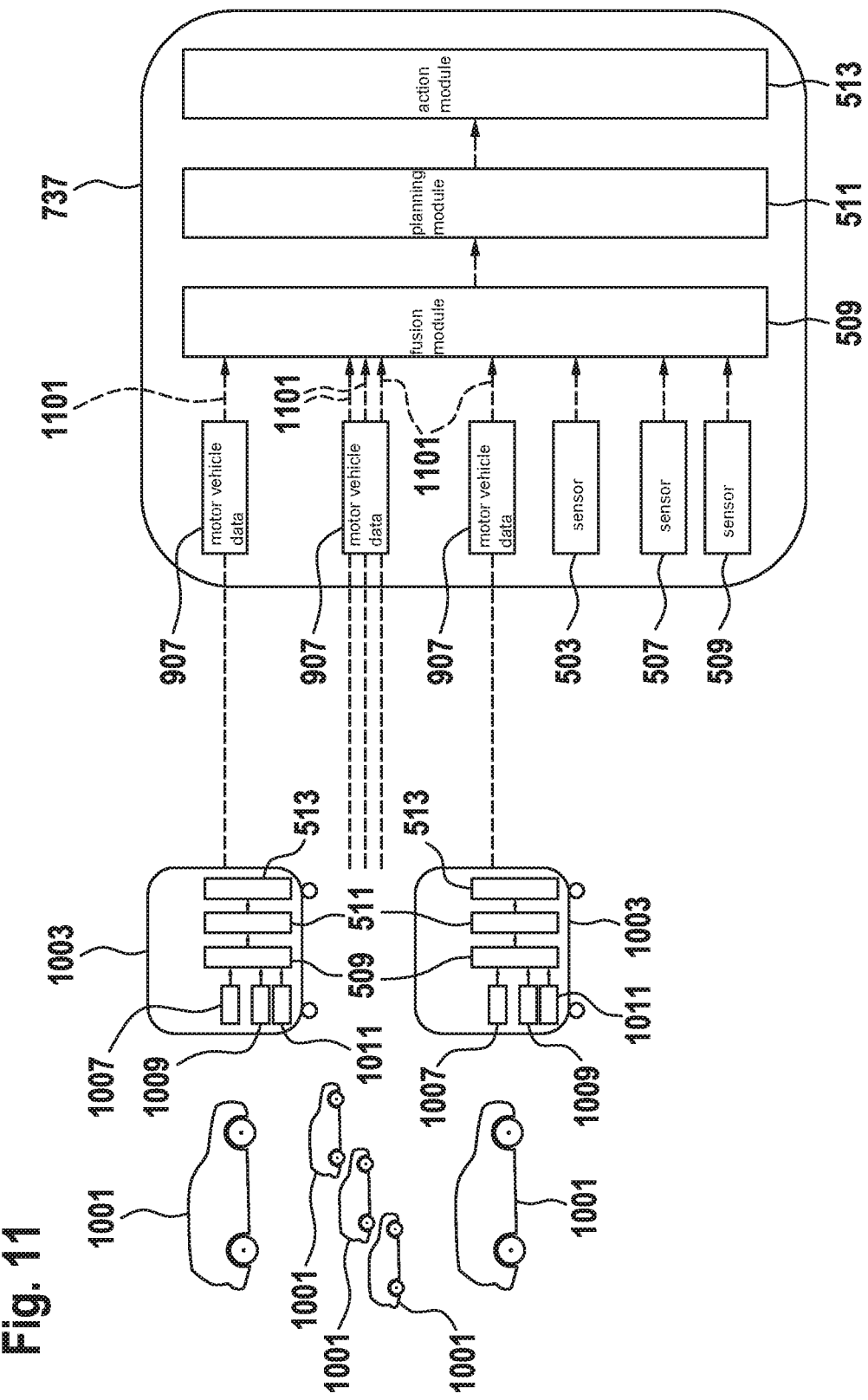

FIG. 11 shows symbolically how multiple motor vehicles 1001 as source motor vehicles provide infrastructure 701 with respective motor vehicle data 907, in accordance with an example embodiment of the present invention.

If motor vehicle data 907 comprise environment sensor data from motor vehicle environment sensors, these may be provided to fusion module 509, which is indicated symbolically by arrows having reference numeral 1101.

Figure 12:
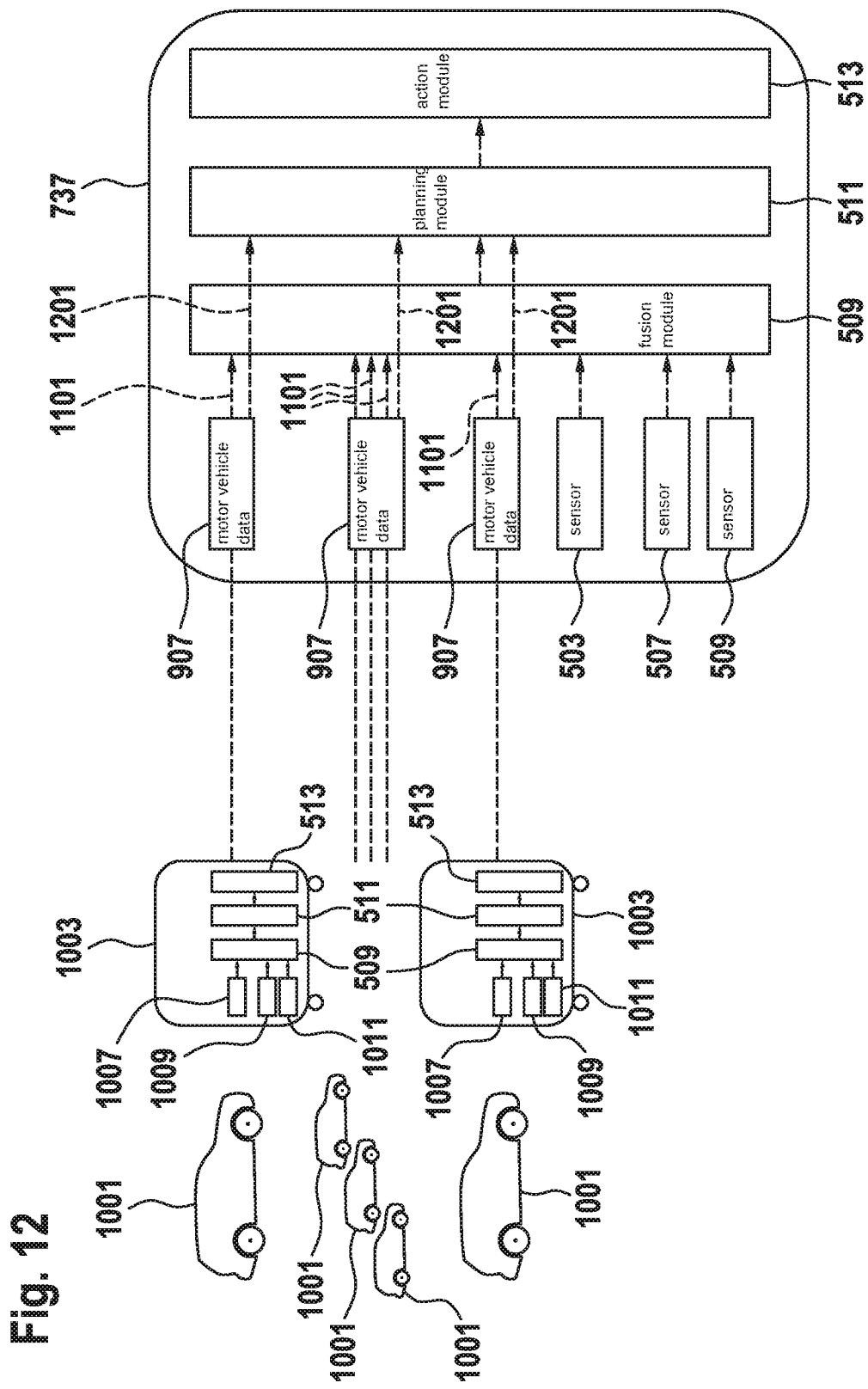

If motor vehicle data 907 comprise environment sensor data from motor vehicle environment sensors, these may be provided, as shown in FIG. 12, to planning module 511, which is indicated symbolically in FIG. 12 by arrows having reference numeral 1201.

Motor vehicle data 907 may be treated by infrastructure 701 like its own infrastructure sensor data. That is to say, in particular, that the motor vehicle sensors may be treated by infrastructure 701 for example like its own infrastructure sensors.

For this to be admissible, there is a provision to check in advance whether at least one safety condition is fulfilled.

If this is the case, motor vehicle data 907 may be used directly for ascertaining infrastructure data.

Directly in this case means in particular that in such a case it is not necessary to perform and/or carry out at least one securing step for ensuring that it is possible to ascertain infrastructure data securely on the basis of the data.

Figure 13:
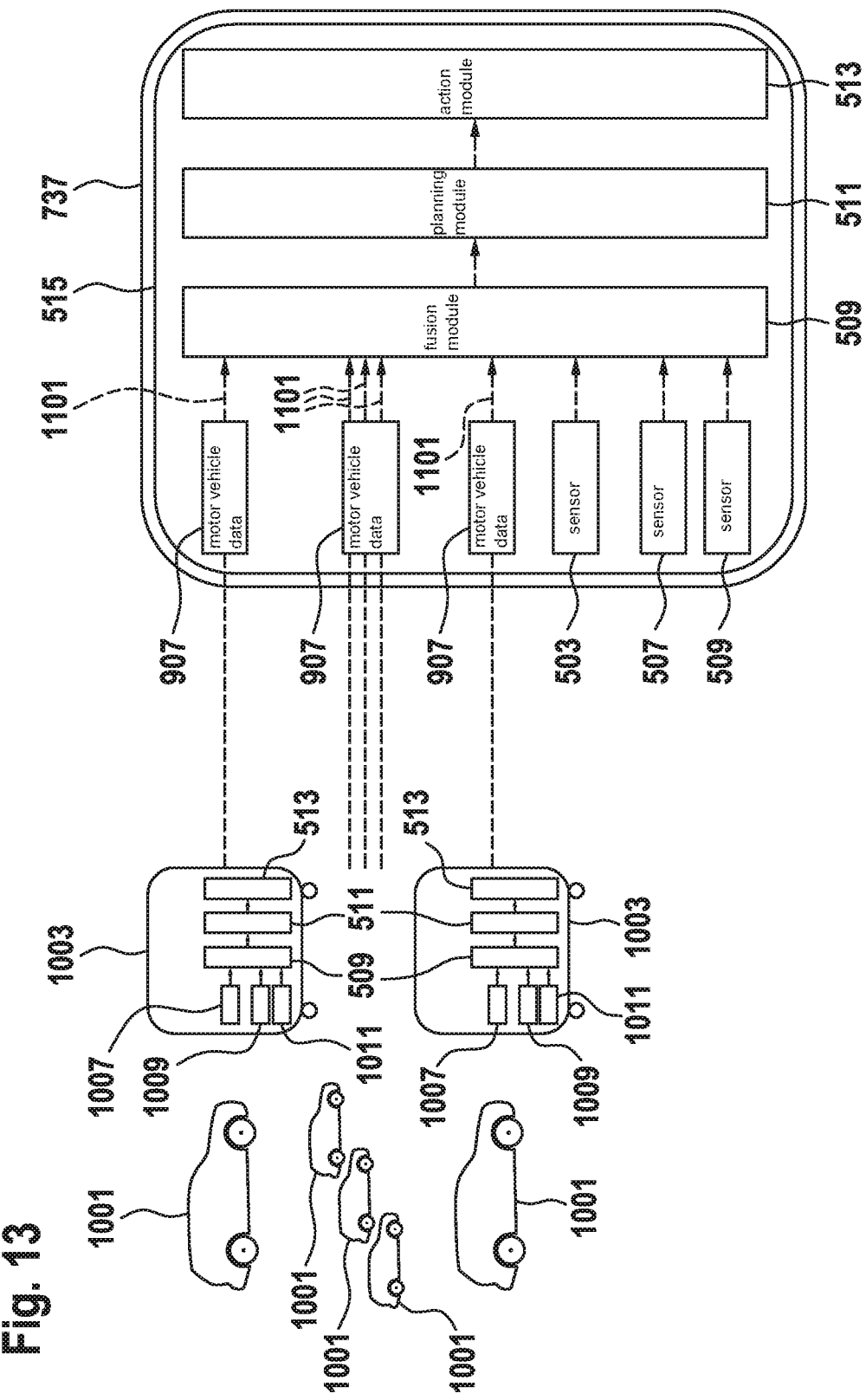

That is to say that in such a case, the motor vehicle sensors are treated like infrastructure sensors, it being assumed that the individual sensors, presently the motor vehicle sensors and the infrastructure sensors fulfill certain safety conditions, which is indicated, in analogy to FIG. 5, by the square 515 having the rounded corners. FIG. 13 shows this symbolically.

If the individual elements do not fulfill certain safety conditions, however, a safety monitoring module 601 may be provided in analogy to FIG. 6, which is shown symbolically in FIG. 14.

FIG. 15 shows an overall picture, which is to explain the concept described here further in exemplary fashion.

A first square 1501 having rounded corners summarizes source motor vehicles 1001 as the source of motor vehicle data.

A second square 1503 having rounded corners summarizes infrastructure 701, in which the motor vehicle data and/or infrastructure sensor data are used to ascertain infrastructure data for the destination motor vehicle 739, on the basis of which it is possible to drive destination motor vehicle 739 in at least partially automated fashion.

A third square 1505 having rounded corners summarizes destination motor vehicle 739 and the transmitted infrastructure data 733.

In order for it to be possible to drive destination motor vehicle 739 safely based on infrastructure data 733 in at least partially automated fashion, in particular multiple, in particular all, elements involved in the method according to the first aspect much fulfill certain safety conditions.

In particular the infrastructure data must be secure, which may be ensured in particular by checking whether a safety condition is fulfilled, by providing a securing step if indicated.

Example embodiments of the present invention are based, inter alia in particular on analyzing how safe, that is, safe and secure, are the individual systems (1501, 1503, 1505), that is, the individual components, that is, for example the (source/destination) motor vehicle, infrastructure traffic systems, infrastructure sensors, infrastructure computer systems (local, cloud) and communication.

In particular an analysis is performed to determine the safety of the entire system or totality with respect to ascertaining the infrastructure data and/or with respect to controlling the lateral and/or longitudinal guidance of the motor vehicle based on the infrastructure data.

Thus, in order to be permitted to control the lateral and/or longitudinal guidance of the motor vehicle based on the infrastructure data, the requirements of the individual systems 1501, 1503, 1505 and of the overall system 1505 must suffice for this purpose. For example, the individual systems 1501, 1503, 1505 and/or their components and the overall system 1505 must exhibit least a specific ASIL level according to the ASIL classification, that is, for example ASIL-B.

Example embodiments of the present invention are further based in particular on the requirement that, if the infrastructure data are to comprise a drive specification, which the motor vehicle is to follow by driving in at least partially automated fashion, the drive specification, which was ascertained by the planning module 511 and which is to be specified to the destination motor vehicle, is checked by safety monitoring module 601 using motor vehicle data and/or infrastructure sensor data and/or at least one algorithm provided by the infrastructure to determine whether the drive specification is safe, the control commands being ascertained by action module 513 as a function of a result of the check whether the drive specification is safe.

One specific embodiment of the present invention provides for the step(s) of checking to be re-checked subsequently, that is, at a later point in time, for example regularly. For example, the step(s) of checking is/are re-checked subsequently at a predetermined frequency, for example every 100 ms.

This re-checking, that is, the re-checking to determine whether the at least one safety condition is fulfilled, occurs according to one specific embodiment prior to and/or after and/or during one or several predetermined method steps.

According to one specific embodiment of the present invention, the re-checking is performed or executed in the event of problems.

What is claimed is:

1. A method for safely ascertaining infrastructure data for driving a motor vehicle in at least partially automated manner, the method comprising:
receiving data signals, which represent: (i) infrastructure sensor data generated by a plurality of infrastructure sensors, and (ii) motor vehicle data generated by at least one source motor vehicle;
receiving safety condition signals, which represent at least one safety condition for safely ascertaining infrastructure data based on the infrastructure sensor data and the motor vehicle data;
checking whether the at least one safety condition is fulfilled;
ascertaining infrastructure data, based on which a destination motor vehicle is drivable in at least a partially automated manner, based on the infrastructure sensor data and the motor vehicle data, as a function of a result of the check as to whether the at least one safety condition is fulfilled;
generating infrastructure data signals, which represent the ascertained infrastructure data; and
outputting the generated infrastructure data signals;
wherein the motor vehicle data includes route data, an environment model of surroundings of the source motor vehicle, and at least two types of data selected from the following group of motor vehicle data: (b) weather data, which represent a weather in a surroundings of the source motor vehicle, (c) traffic data, which represent a traffic in a surroundings of the source motor vehicle, (d) hazard data, which represent a location of a hazard area and/or a type of the hazard area in the surroundings of the source motor vehicle, and (e) road user state data, which represent a state of a road user in the surroundings of the source motor vehicle, wherein the plurality of infrastructure sensors provide the infrastructure data to a fusion module, which is configured fuse the infrastructure sensor data, so that the infrastructure sensor data of the plurality of infrastructure sensors are fused in the fusion module, wherein based on the fused infrastructure sensor data, the fusion module ascertains the environment model of the surroundings of the motor vehicle, which travels on the road, along which the plurality of infrastructure sensors are situated, wherein the environment model and the fused infrastructure sensor data are provided to a planning module, which is configured to prepare a drive plan for the motor vehicle based on the environment model and/or the fused infrastructure sensor data, so that the planning module plans driving maneuvers, which the motor vehicle is to execute in at least the partially automated manner, wherein the planned driving maneuver is provided to an action module, which is configured to ascertain traffic system control commands for controlling a lateral and/or longitudinal guidance of the motor vehicle based on the planned driving maneuver so that when the lateral and/or longitudinal guidance of the motor vehicle is controlled based on the control commands, the motor vehicle performs or drives the planned driving maneuver in the at least partially automated manner, and wherein the action module is configured to output the traffic system control commands for controlling one or multiple traffic systems, wherein the traffic systems include at least one of the following: a light signal system, a barrier, and/or a variable message sign, and wherein the traffic system control commands are generated based on the motor vehicle data the infrastructure sensor data, and a drive specification, which the destination motor vehicle is to follow by driving in at least a partially automated manner, wherein the motor vehicle data includes motor vehicle data, including diagnostic data, and wherein the at least one safety condition includes an existence of a predefined safety integrity level or automotive safety integrity level of at least the source motor vehicle and the infrastructure, a communication link and/or communication components with respect to overall systems in the source motor vehicle and infrastructure, and wherein the at least one safety condition includes an existence of a maximum latency of a communication between the source motor vehicle and the infrastructure, and at least one element selected from the following group of safety conditions:

(i) existence of a confirmation of the source motor vehicle that the motor vehicle data are safe, (iii) existence of a predetermined computer protection level of a device for performing the steps of the method, (iv) existence of predetermined components and/or algorithms and/or communication options that are used for performing the steps of the method, (vi) existence of predetermined availability information, which indicates an availability of predetermined components and/or algorithms and/or communication options, (vii) existence of a plan which includes measures for reducing errors and/or measures in the event of failures of predetermined components and/or algorithms and/or communication options and/or measures for fault analyses and/or measures in the event of misinterpretations, (viii) existence of one or multiple fallback scenarios, (ix) existence of a predetermined function, (x) existence of a predetermined traffic situation, (xi) existence of a predetermined weather, (xii) a maximally possible time for a respective implementation and/or execution of a step or of multiple steps of the method, (xiii) existence of a result of a check to determine that elements and/or functions, which are used for carrying out the method, currently function in a faultless manner.

2. The method as recited in claim 1, wherein, where the at least one safety condition is not fulfilled, the ascertaining of infrastructure data includes at least one securing step for ensuring that the infrastructure data may be ascertained safely based on the infrastructure sensor data and the motor vehicle data.

3. The method as recited in claim 2, wherein the at least one securing step is respectively selected from the following group of securing steps:

(i) redundant processing including computing of the infrastructure sensor data and the motor vehicle data, (ii) diversitary processing of the infrastructure sensor data and the motor vehicle data, and (iii) checking an operability of a redundant component for processing the infrastructure sensor data and the motor vehicle data.

4. The method as recited in claim 1, wherein the infrastructure data includes traffic data, which represent a traffic in a surroundings of the destination motor vehicle, and one or several elements selected from the following group of infrastructure data:

(i) infrastructure sensor data of an infrastructure environment sensor, (ii) surroundings data, which represent a surroundings of the destination motor vehicle, (iii) weather data, which represent a weather in a surroundings of the destination motor vehicle, (iv) hazard data, which represent a location of a hazard area and/or a type of the hazard area in the surroundings of the destination motor vehicle, (v) road user state data, which represent a state of a road user in the surroundings of the destination motor vehicle, (vi) remote control commands for remote-controlling a lateral and/or longitudinal guidance of the destination motor vehicle, and (vii) motor vehicle data.

5. The method as recited in claim 1, wherein the motor vehicle data includes an element selected from the following group of motor vehicle data:

(ii) position data, (iii) speed data, (iv) environment sensor data of an environment sensor of the source motor vehicle.

6. The method as recited in claim 1, wherein the at least one safety condition includes an existence of predetermined quality criteria of the predetermined components and/or algorithms and/or communication options.

7. An apparatus for safely ascertaining infrastructure data for driving a motor vehicle in at least a partially automated manner, comprising:
a-device configured to perform the following:
receiving data signals, which represent: (i) infrastructure sensor data generated by at least one infrastructure sensor, and (ii) motor vehicle data generated by at least one source motor vehicle;
receiving safety condition signals, which represent at least one safety condition for safely ascertaining infrastructure data based on the infrastructure sensor data and the motor vehicle data;
checking whether the at least one safety condition is fulfilled;
ascertaining infrastructure data, based on which a destination motor vehicle is drivable in at least a partially automated manner, based on the infrastructure sensor data and the motor vehicle data, as a function of a result of the check as to whether the at least one safety condition is fulfilled;
generating infrastructure data signals, which represent the ascertained infrastructure data; and
outputting the generated infrastructure data signals;
wherein the motor vehicle data includes route data, an environment model of surroundings of the source motor vehicle, and at least two types of data selected from the following group of motor vehicle data: (b) weather data, which represent a weather in a surroundings of the source motor vehicle, (c) traffic data, which represent a traffic in a surroundings of the source motor vehicle, (d) hazard data, which represent a location of a hazard area and/or a type of the hazard area in the surroundings of the source motor vehicle, and (e) road user state data, which represent a state of a road user in the surroundings of the source motor vehicle,
wherein the plurality of infrastructure sensors provide the infrastructure data to a fusion module, which is configured fuse the infrastructure sensor data, so that the infrastructure sensor data of the plurality of infrastructure sensors are fused in the fusion module,
wherein based on the fused infrastructure sensor data, the fusion module ascertains the environment model of the surroundings of the motor vehicle, which travels on the road, along which the plurality of infrastructure sensors are situated,
wherein the environment model and the fused infrastructure sensor data are provided to a planning module, which is configured to prepare a drive plan for the motor vehicle based on the environment model and/or the fused infrastructure sensor data, so that the planning module plans driving maneuvers, which the motor vehicle is to execute in at least the partially automated manner,
wherein the planned driving maneuver is provided to an action module, which is configured to ascertain traffic system control commands for controlling a lateral and/or longitudinal guidance of the motor vehicle based on the planned driving maneuver so that when the lateral and/or longitudinal guidance of the motor vehicle is controlled based on the control commands, the motor vehicle performs or drives the planned driving maneuver in the at least partially automated manner, and wherein the action module is configured to output the traffic system control commands for controlling one or multiple traffic systems,
wherein the traffic systems include at least one of the following: a light signal system, a barrier, and/or a variable message sign, and wherein the traffic system control commands are generated based the motor vehicle data, the infrastructure sensor data, and a drive specification, which the destination motor vehicle is to follow by driving in at least a partially automated manner, and
wherein the motor vehicle data includes motor vehicle data, including diagnostic data, and
wherein the at least one safety condition includes an existence of a predefined safety integrity level or automotive safety integrity level of at least the source motor vehicle and the infrastructure, a communication link and/or communication components with respect to overall systems in the source motor vehicle and infrastructure, and wherein the at least one safety condition includes an existence of a maximum latency of a communication between the source motor vehicle and the infrastructure, and at least one element selected from the following group of safety conditions:
(i) existence of a confirmation of the source motor vehicle that the motor vehicle data are safe,
(iii) existence of a predetermined computer protection level of a device for performing the steps of the method,
(iv) existence of predetermined components and/or algorithms and/or communication options that are used for performing the steps of the method,
(vi) existence of predetermined availability information, which indicates an availability of predetermined components and/or algorithms and/or communication options,
(vii) existence of a plan which includes measures for reducing errors and/or measures in the event of failures of predetermined components and/or algorithms and/or communication options and/or measures for fault analyses and/or measures in the event of misinterpretations,
(viii) existence of one or multiple fallback scenarios,
(ix) existence of a predetermined function,
(x) existence of a predetermined traffic situation,
(xi) existence of a predetermined weather,
(xii) a maximally possible time for a respective implementation and/or execution of a step or of multiple steps of the method,
(xiii) existence of a result of a check to determine that elements and/or functions, which are used for carrying out the method, currently function in a faultless manner.

8. The device as recited in claim 7, wherein the device is situated in an infrastructure.

9. A non-transitory machine-readable storage medium, on which is stored a computer program, which is executable by a processor, comprising:
a program code arrangement having program code for safely ascertaining infrastructure data for driving a motor vehicle in at least partially automated manner by performing the following:
receiving data signals, which represent: (i) infrastructure sensor data generated by at least one infrastructure sensor, and (ii) motor vehicle data generated by at least one source motor vehicle;
receiving safety condition signals, which represent at least one safety condition for safely ascertaining infrastructure data based on the infrastructure sensor data and the motor vehicle data;

checking whether the at least one safety condition is fulfilled;

ascertaining infrastructure data, based on which a destination motor vehicle is drivable in at least a partially automated manner, based on the infrastructure sensor data and the motor vehicle data, as a function of a result of the check as to whether the at least one safety condition is fulfilled;

generating infrastructure data signals, which represent the ascertained infrastructure data; and outputting the generated infrastructure data signals;

wherein the motor vehicle data includes route data, an environment model of surroundings of the source motor vehicle, and at least two types of data selected from the following group of motor vehicle data: (b) weather data, which represent a weather in a surroundings of the source motor vehicle, (c) traffic data, which represent a traffic in a surroundings of the source motor vehicle, (d) hazard data, which represent a location of a hazard area and/or a type of the hazard area in the surroundings of the source motor vehicle, and (e) road user state data, which represent a state of a road user in the surroundings of the source motor vehicle, wherein the plurality of infrastructure sensors provide the infrastructure data to a fusion module, which is configured fuse the infrastructure sensor data, so that the infrastructure sensor data of the plurality of infrastructure sensors are fused in the fusion module, wherein based on the fused infrastructure sensor data, the fusion module ascertains the environment model of the surroundings of the motor vehicle, which travels on the road, along which the plurality of infrastructure sensors are situated, wherein the environment model and the fused infrastructure sensor data are provided to a planning module, which is configured to prepare a drive plan for the motor vehicle based on the environment model and/or the fused infrastructure sensor data, so that the planning module plans driving maneuvers, which the motor vehicle is to execute in at least the partially automated manner, wherein the planned driving maneuver is provided to an action module, which is configured to ascertain traffic system control commands for controlling a lateral and/or longitudinal guidance of the motor vehicle based on the planned driving maneuver so that when the lateral and/or longitudinal guidance of the motor vehicle is controlled based on the control commands, the motor vehicle performs or drives the planned driving maneuver in the at least partially automated manner, and wherein the action module is configured to output the traffic system control commands for controlling one or multiple traffic systems, wherein the traffic systems include at least one of the following: a light signal system, a barrier, and/or a variable message sign, and wherein the traffic system control commands are generated based on the motor vehicle data, the infrastructure sensor data, and a drive specification, which the destination motor vehicle is to follow by driving in at least a partially automated manner, and wherein the motor vehicle data includes motor vehicle data, including diagnostic data, and wherein the at least one safety condition includes an existence of a predefined safety integrity level or automotive safety integrity level of at least the source motor vehicle and the infrastructure, a communication link and/or communication components with respect to overall systems in the source motor vehicle and infrastructure, and wherein the at least one safety condition includes an existence of a maximum latency of a communication between the source motor vehicle and the infrastructure, and at least one element selected from the following group of safety conditions:

(i) existence of a confirmation of the source motor vehicle that the motor vehicle data are safe, (iii) existence of a predetermined computer protection level of a device for performing the steps of the method, (iv) existence of predetermined components and/or algorithms and/or communication options that are used for performing the steps of the method, (vi) existence of predetermined availability information, which indicates an availability of predetermined components and/or algorithms and/or communication options, (vii) existence of a plan which includes measures for reducing errors and/or measures in the event of failures of predetermined components and/or algorithms and/or communication options and/or measures for fault analyses and/or measures in the event of misinterpretations, (viii) existence of one or multiple fallback scenarios, (ix) existence of a predetermined function, (x) existence of a predetermined traffic situation, (xi) existence of a predetermined weather, (xii) a maximally possible time for a respective implementation and/or execution of a step or of multiple steps of the method, (xiii) existence of a result of a check to determine that elements and/or functions, which are used for carrying out the method, currently function in a faultless manner.

* * * * *